(12) United States Patent
Monden

(10) Patent No.: US 11,979,529 B2
(45) Date of Patent: May 7, 2024

(54) INFORMATION PROCESSING APPARATUS, INFORMATION PROCESSING METHOD, AND NON-TRANSITORY RECORDING MEDIUM FOR READING ALOUD CONTENT FOR VISUALLY IMPAIRED USERS

(71) Applicant: Nobuya Monden, Kanagawa (JP)

(72) Inventor: Nobuya Monden, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/936,065

(22) Filed: Sep. 28, 2022

(65) Prior Publication Data

US 2023/0120752 A1 Apr. 20, 2023

(30) Foreign Application Priority Data

Oct. 19, 2021 (JP) ................................. 2021-170952

(51) Int. Cl.
*H04N 1/00* (2006.01)
*G06V 20/64* (2022.01)

(52) U.S. Cl.
CPC ......... *H04N 1/00514* (2013.01); *G06V 20/64* (2022.01); *H04N 1/00251* (2013.01); *H04N 1/00342* (2013.01)

(58) Field of Classification Search
CPC .......... H04N 1/00514; H04N 1/00251; H04N 1/00342; G06V 20/64
See application file for complete search history.

(56) References Cited

U.S. PATENT DOCUMENTS

2003/0036909 A1* 2/2003 Kato .................. H04N 1/00429
704/E15.045

FOREIGN PATENT DOCUMENTS

| EP | 3865993 A1 | * | 8/2021 | ............... G06F 3/12 |
|----|------------|---|--------|--------------------------|
| JP | 2000322178 A | * | 11/2000 | |
| JP | 2003168110 A | * | 6/2003 | |
| JP | 2008-083766 | | 4/2008 | |
| JP | 2015230663 A | * | 12/2015 | |
| JP | 2017-007828 | | 1/2017 | |
| JP | 2018-197149 | | 12/2018 | |
| JP | 2019-128846 | | 8/2019 | |
| JP | 2020-118771 | | 8/2020 | |

* cited by examiner

Primary Examiner — Moustapha Diaby
(74) Attorney, Agent, or Firm — IPUSA, PLLC

(57) ABSTRACT

An information processing apparatus includes: circuitry that detects information relating to a user of the information processing apparatus, determines whether the user is a visually impaired person based on the information relating to the user, and based on a determination indicating that the user is the visually impaired person, enable a voice reading operation function for the visually impaired person.

8 Claims, 7 Drawing Sheets

INFORMATION PROCESSING APPARATUS, INFORMATION PROCESSING METHOD, AND NON-TRANSITORY RECORDING MEDIUM FOR READING ALOUD CONTENT FOR VISUALLY IMPAIRED USERS

CROSS-REFERENCE TO RELATED APPLICATIONS

This patent application is based on and claims priority pursuant to 35 U.S.C. § 119(a) to Japanese Patent Application No. 2021-170952, filed on Oct. 19, 2021, in the Japan Patent Office, the entire disclosure of which is hereby incorporated by reference herein.

BACKGROUND

Technical Field

The present disclosure relates to an information processing apparatus, an information processing method, and a non-transitory recording medium.

Related Art

There is known a function of reading aloud operation information on an electronic apparatus such as an image forming apparatus or a terminal apparatus by voice for a visually impaired person such as a weak-sighted person or a totally blind person. For example, there is a technique of outputting a voice of an operation state using an operation key every time when an operation function changes.

However, with the technique of related art, the voice reading operation function for a visually impaired person could not be enabled.

SUMMARY

According to an embodiment of the present disclosure, an information processing apparatus includes circuitry that detects information relating to a user of the information processing apparatus, determines whether the user is a visually impaired person based on the information relating to the user, and based on a determination that the user is the visually impaired person, enables a voice reading operation function for the visually impaired person.

According to another embodiment of the present disclosure, an information processing method includes detecting information relating to a user of an information processing apparatus; determining whether the user is a visually impaired person based on the information relating to the user; and based on a determination that the user is the visually impaired person, enabling a voice reading operation function for the visually impaired person.

According to still another embodiment of the present disclosure, a non-transitory recording medium, when executed by one or more processors, causes the processors to perform an information processing method. The information processing method includes detecting information relating to a user of an information processing apparatus; determining whether the user is a visually impaired person based on the information relating to the user; and based on a determination that the user is the visually impaired person, enabling a voice reading operation function for the visually impaired person.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
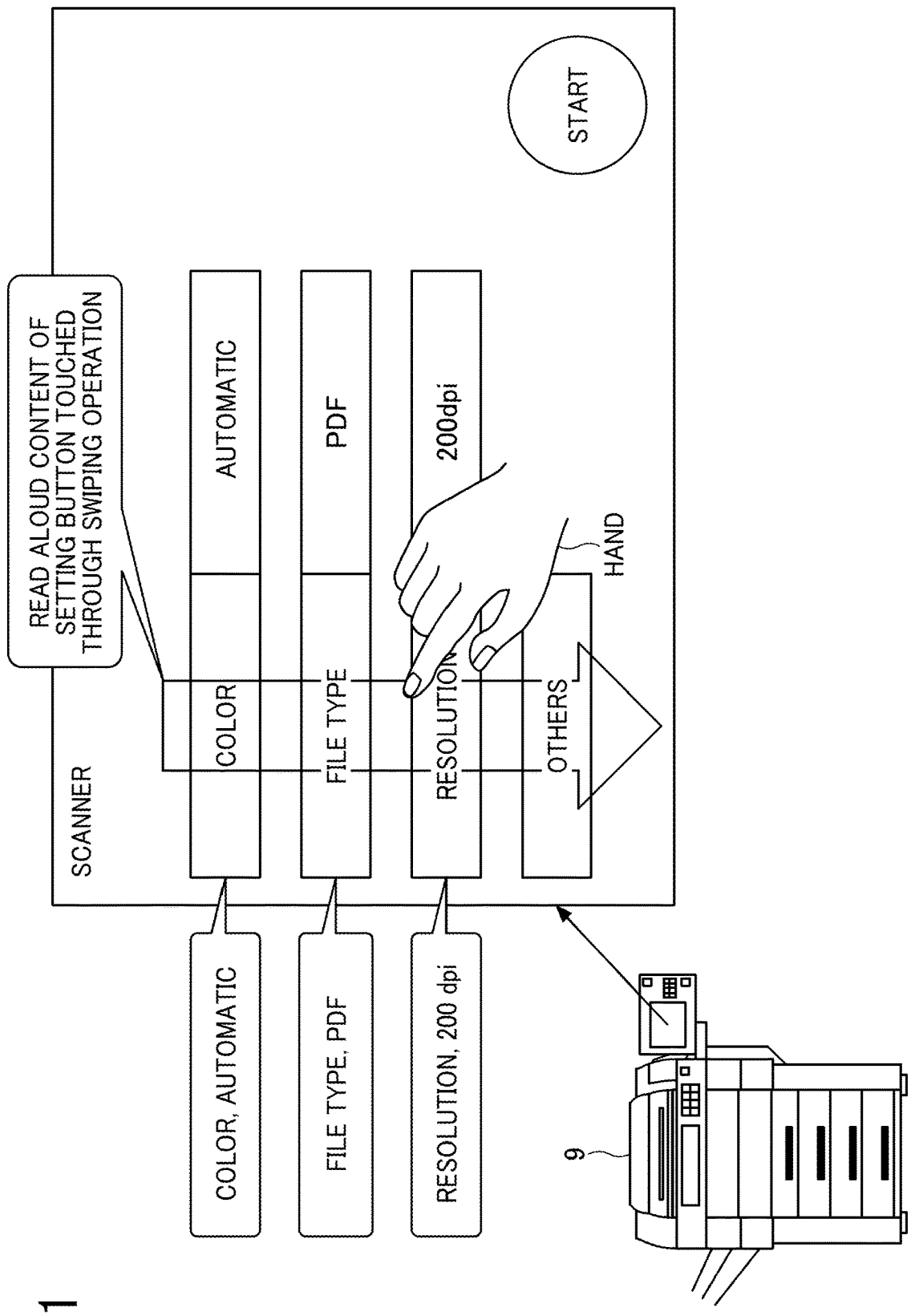
FIG. 1 is a view illustrating an example of a voice reading operation function according to one or more embodiments of the disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, an information processing apparatus, an information processing method, and a program according to embodiments of the present disclosure will be described in detail with reference to the accompanying drawings.

First Embodiment

System Overview

FIG. 1 is a schematic view illustrating an example of a voice reading operation function according to an embodiment of the disclosure. FIG. 1 illustrates a setting screen of a scanner in which a voice reading operation function for a visually impaired person is enabled in a touch panel with which an operation of an image forming apparatus 9 is performed. When a user performs an operation of swiping on the touch panel (moving a finger on the screen while keeping the finger in contact with the screen), the type of setting for the button touched by the finger and the current setting value are read aloud. For example, when the user touches a color setting button, the type of setting and the current setting value are read aloud as "color setting, automatic"; when the user touches a file type setting button, the type of setting and the current setting value are read aloud as "file type, PDF"; and when the user touches a resolution setting button, the type of setting and the current setting value are read aloud as "resolution, 200 dpi".

In the embodiment of the disclosure, first, the image forming apparatus 9 detects information relating to a visually impaired person as a user, and then determines whether the user is a visually impaired person based on the detected information. Finally, when determining that the user is the visually impaired person, the image forming apparatus 9 enables a voice reading operation function of the apparatus operated by the user. In this case, the apparatus operated by the user is not limited to the image forming apparatus 9, and may be any information processing apparatus 1 having a voice reading operation function. For example, the apparatus operated by the user may be a ticket vending machine for a ticket or the like installed in a station or the like.

Hardware Configuration Example

Figure 2:
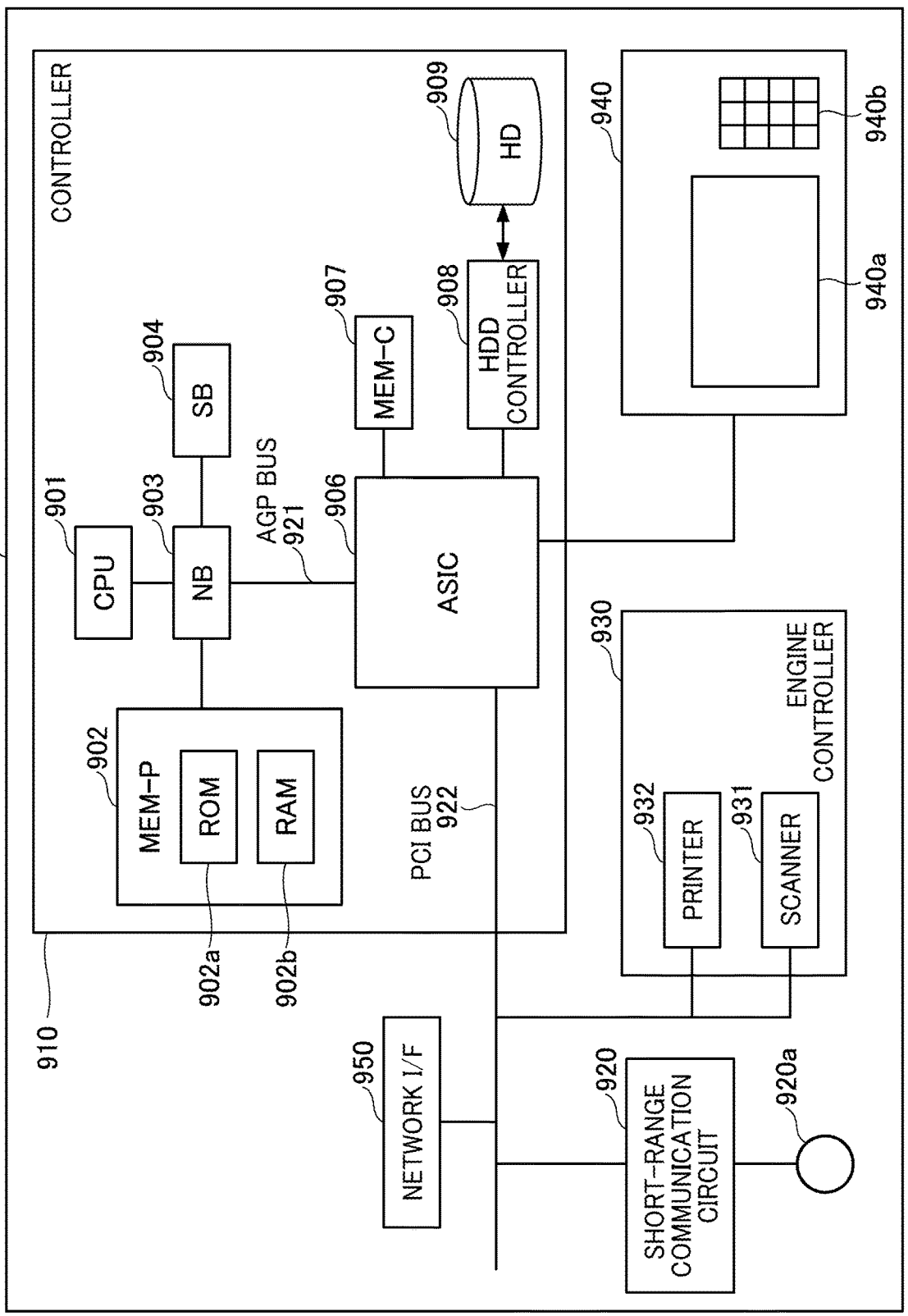
FIG. 2 is a diagram illustrating an example of a hardware configuration of an information processing apparatus and an image forming apparatus according to one or more embodiments of the disclosure.

FIG. 2 is a diagram illustrating an example of a hardware configuration of the information processing apparatus 1 and the image forming apparatus 9 according to an embodiment of the disclosure. As illustrated in FIG. 2, the information processing apparatus 1 and the image forming apparatus 9 (or referred to as MFP which stands for a multifunction peripheral, a multifunction product, or a multifunction printer) include a controller 910, a short-range communication circuit 920, an engine controller 930, an operation panel 940, and a network interface (I/F) 950.

Among these components, the controller 910 includes a central processing unit (CPU) 901 that is a main part of a computer, a system memory (MEM-P) 902, a north bridge (NB) 903, a south bridge (SB) 904, an application specific integrated circuit (ASIC) 906, a local memory (MEM-C) 907, a hard disk drive (HDD) controller 908, and a hard disk (HD) 909. The NB 903 and the ASIC 906 are coupled to each other via an accelerated graphics port (AGP) bus 921.

The CPU 901 among these components is a control unit that performs overall control of the information processing apparatus 1 and the image forming apparatus 9. The NB 903 is a bridge for coupling the CPU 901 to the MEM-P 902, the SB 904, and the AGP bus 921, and includes a memory controller that controls reading or writing from or to the MEM-P 902, a peripheral component interconnect (PCI) master, and an AGP target.

The MEM-P 902 includes a read-only memory (ROM) 902*a* that is a memory for storing a program and data to implement each function of the controller 910, and a random access memory (RAM) 902*b* that is used as a memory for drawing when developing the program and data and printing data from the memory. The program stored in the RAM 902*b* may be provided by being recorded in a computer-readable recording medium such as a compact disk read-only memory (CD-ROM), a compact disk recordable (CD-R), or a digital versatile disk (DVD) in a file of an installable format or an executable format.

The SB 904 couples the NB 903 to a PCI device and a peripheral device. The ASIC 906 is an integrated circuit (IC) having a hardware element for image processing and dedicated to an image processing use, and serves as a bridge that couples the AGP bus 921, a PCI bus 922, the HDD controller 908, and the MEM-C 907 to each other. The ASIC 906 includes a PCI target, an AGP master, an arbiter (ARB) as a central processor of the ASIC 906, a memory controller, a plurality of direct memory access controllers (DMACs), and a PCI unit. The memory controller controls the MEM-C 907. For example, the DMACs rotate image data with a hardware logic or the like. The PCI unit transfers data between a scanner engine (scanner) 931 and a printer engine (printer) 932 through the PCI bus 922. In one example, a Universal Serial Bus (USB) interface or an Institute of Electrical and Electronics Engineers 1394 (IEEE 1394) interface may be coupled to the ASIC 906.

The short-range communication circuit 920 includes a card reader 920*a* for reading authentication information or the like of a user stored in an IC card or the like. The operation panel 940 includes a touch panel 940*a* and a numeric keypad 940*b* that receive input by a user. The touch panel 940*a* also displays a screen of an application or the like that is executed by the image forming apparatus 9.

Functions

Figure 3:
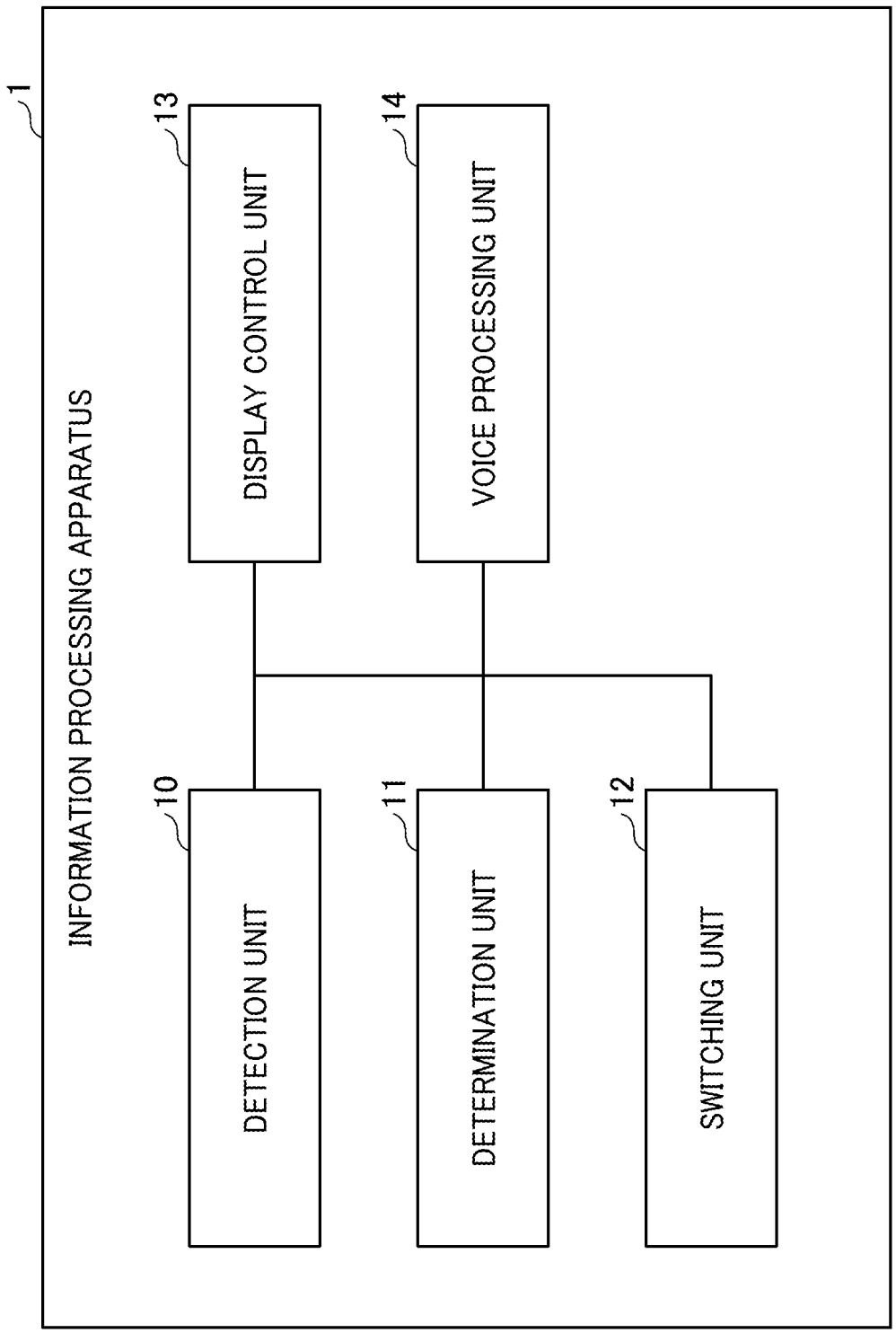
FIG. 3 is a configuration diagram illustrating an example of functional blocks in the information processing apparatus according to one or more embodiments of the disclosure.

FIG. 3 is a configuration diagram illustrating an example of functional blocks in the information processing apparatus 1 according to an embodiment of the disclosure. The information processing apparatus 1 includes a detection unit 10, a determination unit 11, a switching unit 12, a display control unit 13, and a voice processing unit 14. These units are functions or means that are implemented by the CPU 901 executing instructions included in at least one program installed in the information processing apparatus 1.

The detection unit 10 detects information relating to a visually impaired person as a user of the information processing apparatus 1. For example, the detection unit 10 detects a person, parts of the person such as the head, face, arms, hands, body, and legs, and further a white cane or the like used by a visually impaired person from an image captured by a camera included in the information processing apparatus 1.

In one example, the detection unit 10 detects a wireless tag held by a visually impaired person using a wireless tag detector included in the information processing apparatus 1. In another example, the detection unit 10 detects a feature in an operation such as touching a region that is not effective in the operation when a user operates a touch panel or the like of the image forming apparatus 9.

The determination unit 11 determines whether the visually impaired person is using the information processing apparatus 1 or is going to use the information processing apparatus 1 based on the information relating to the visually impaired person detected by the detection unit 10. For example, when a white cane is present near a hand of a person detected from an image captured by the camera included in the information processing apparatus 1, the determination unit 11 determines that a visually impaired person is using the information processing apparatus 1. In one example, when the detection unit 10 detects a wireless tag held by a visually impaired person present near the information processing apparatus 1, the determination unit 11 determines that the visually impaired person is using the information processing apparatus 1. In another example, when an operation such as touching a region that is not effective in the operation is detected in the operation on the touch panel detected by the detection unit 10, the determination unit 11 determines that a visually impaired person is using the information processing apparatus 1. In this disclosure, the determination unit 11 determines that a particular object is near the user or the information processing apparatus 1 based on whether the particular object is within a preset distance from the user or the information processing apparatus 1.

When the switching unit 12 determines that the visually impaired person is using the information processing apparatus 1 or is going to use the information processing apparatus 1 as the determination result of the determination unit 11, the switching unit 12 enables the voice reading operation function of the information processing apparatus 1. That is, the switching unit 12 switches the disabled voice reading operation function of the information processing apparatus 1 to be enabled based on the determination result of the determination unit 11.

The display control unit 13 displays an operation screen when a service is used, such as a menu screen or a setting screen, on the screen of the touch panel of the image forming apparatus 9 or the like.

The voice processing unit 14 outputs a voice such as a voice message in the voice reading operation function or a voice message to confirm with the user whether the voice reading operation function is allowed to be enabled.

Flowchart of Processing

Figure 4:
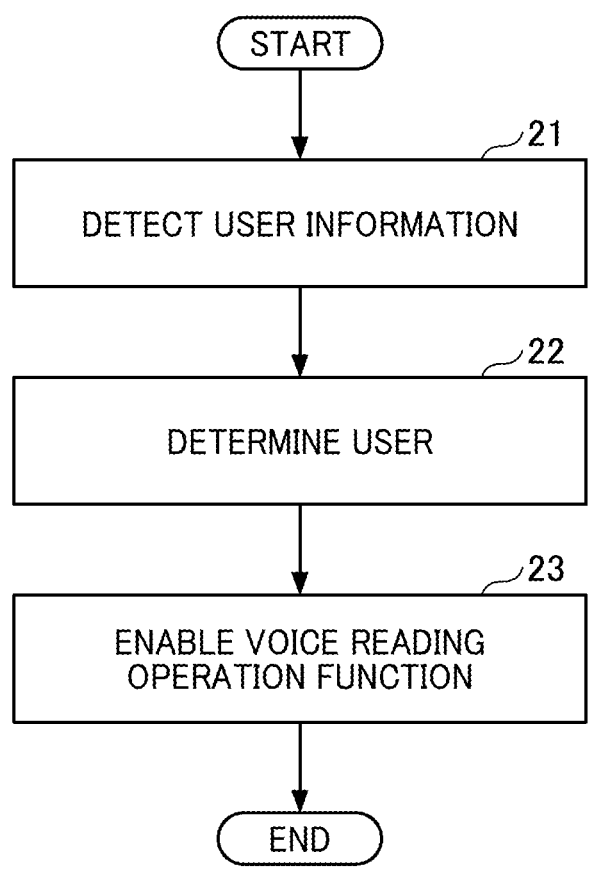
FIG. 4 is a flowchart presenting an example of processing in the information processing apparatus according to one or more embodiments of the disclosure.

FIG. 4 is a flowchart presenting an example of processing in the information processing apparatus according to an embodiment of the disclosure. Hereinafter, each step executed by the information processing apparatus 1 will be described.

Step S21: The detection unit 10 of the information processing apparatus 1 detects information relating to a visually impaired person as a user of the information processing apparatus 1. For example, the detection unit 10 detects a person, parts of the person such as the head, face, arms, hands, body, and legs, and further a white cane or the like used by the visually impaired person from an image captured by the camera included in the information processing apparatus 1.

Step S22: The determination unit 11 of the information processing apparatus 1 determines whether the visually impaired person is using the information processing apparatus 1 or is going to use the information processing apparatus 1 based on the information relating to the visually impaired person detected by the detection unit 10. For example, when a white cane is present near a hand of a person detected from an image captured by the camera included in the information processing apparatus 1, the determination unit 11 determines that the visually impaired person is using the information processing apparatus 1.

Step S23: When the determination unit 11 determines that the visually impaired person is using the information processing apparatus 1 or is going to use the information processing apparatus 1, the switching unit 12 of the information processing apparatus 1 enables the voice reading operation function of the information processing apparatus 1. In this case, before the voice reading operation function is enabled, the voice processing unit 14 may output a voice message to confirm with the user whether the voice reading operation function is allowed to be enabled.

With the above-described processing, the information processing apparatus 1 can enable the voice reading operation function when the visually impaired person is using the information processing apparatus 1 or is going to use the information processing apparatus 1. For example, although a predetermined operation is executed to enable the voice reading operation function, in some cases, the visually impaired person does not know the operation in advance or cannot perform an operation. In contrast, with the processing according to the embodiment of the present disclosure, the voice reading operation function can be enabled without the user performing an operation.

Hereinafter, the processing illustrated in FIG. 4 will be described in detail.

Description of Processing

Figure 5:
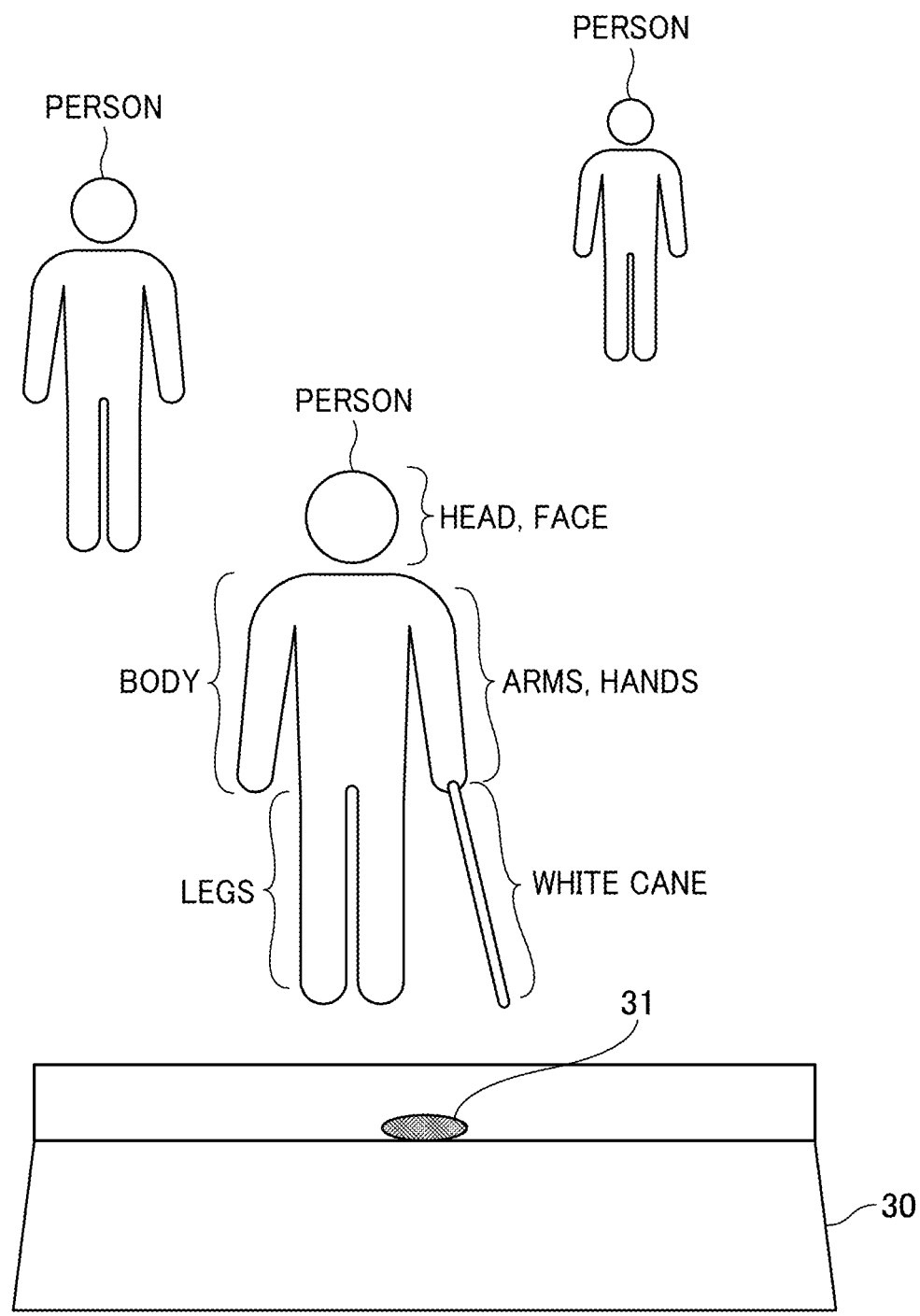
FIG. 5 is a diagram illustrating processing in an information processing apparatus according to a first embodiment of the disclosure.

FIG. 5 is a diagram illustrating processing in an information processing apparatus 1 according to a first embodiment of the disclosure. Processing in a case where a visually impaired person uses a ticket vending machine 30 for a ticket or the like installed in a station or the like will be described according to the first embodiment.

First, as the processing in step S21 in FIG. 4, the detection unit 10 analyzes an image captured by a camera 31 included in the ticket vending machine 30 to detect a person, parts of the person such as the head, arms, hands, body, and legs, and further a white cane or the like used by a visually impaired person from the image. To detect the white cane, information such as the shape and color of the detected object and the distance between the detected object and the hand of the person is detected.

Then, as the processing in step S22 in FIG. 4, the determination unit 11 determines whether the visually impaired person is using the information processing apparatus 1 or is going to use the information processing apparatus 1 based on the information detected by the detection unit 10. When a plurality of persons are detected, the person located closest to the ticket vending machine 30 or the camera 31 is determined as a user, and it is determined whether the user is a visually impaired person. As a method of determining the person closest to the ticket vending machine 30 or the camera 31, for example, the determination unit 11 may use a binocular camera (or also referred to as stereo camera) to measure the distance between the camera 31 and the person. In one example, the distance may be measured using a laser measuring device or an ultrasonic measuring device. In another example, the determination unit 11 may analyze the direction of the face or the line of sight of the detected person and determine that the person faces the direction of the ticket vending machine 30 or the camera 31 to determine that the person is using the ticket vending machine 30 or is going to use the ticket vending machine 30.

In still another example, the determination unit 11 may determine that the detected person is approaching the ticket vending machine 30 using a plurality of images continuous in terms of time or a moving image captured by the camera 31 to determine that the detected person is going to use the ticket vending machine 30.

Then, to determine whether the person determined as being using the ticket vending machine 30 or being going to use the ticket vending machine 30 is a visually impaired person, for example, the determination unit 11 determines whether the determined person has a white cane. As a method of determining whether the detected object is a white cane, for example, the determination unit 11 determines that the detected object is a white cane when the detected object has a thin and long rod-like shape and is white in color. In one example, the determination unit 11 determines that the determined person has a white cane based on whether the object detected as the white cane is present near the hand of the determined person.

In another example, the determination unit 11 may determine that the determined person is a visually impaired person when the user has his/her face very close to the ticket vending machine 30.

Finally, as the processing in step S23 in FIG. 4, the switching unit 12 enables the voice reading operation function of the ticket vending machine 30 when the determination unit 11 determines that the visually impaired person is using the ticket vending machine 30 or is going to use the ticket vending machine 30.

Second Embodiment

Figure 6:
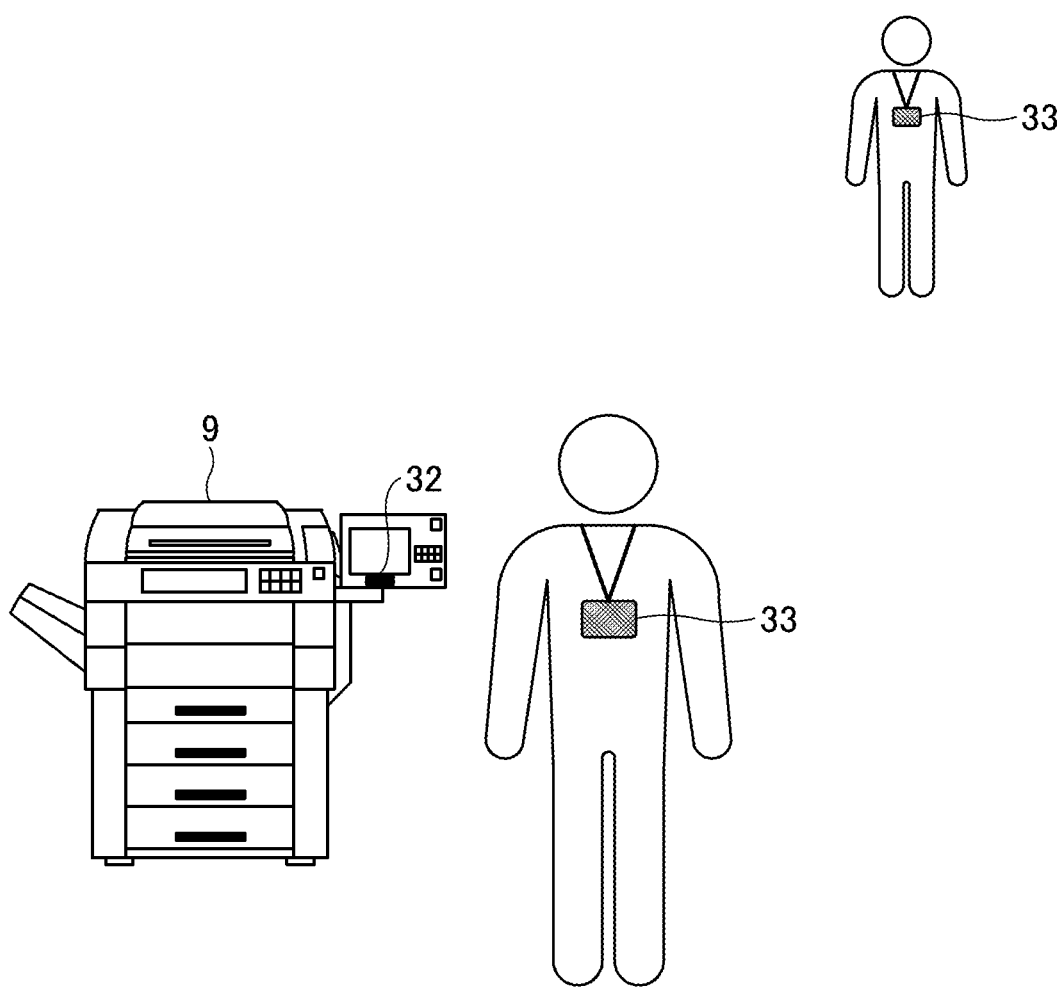
FIG. 6 is a diagram illustrating processing in an information processing apparatus according to a second embodiment of the disclosure.

FIG. 6 is a diagram illustrating processing in an information processing apparatus 1 according to a second embodiment of the disclosure. Processing in a case where a visually impaired person holding a wireless tag 33 uses an image forming apparatus 9 including a wireless tag detector 32 is described according to the second embodiment.

First, as the processing in step S21 in FIG. 4, the detection unit 10 detects a wireless tag 33 held by a user of the image forming apparatus 9 using the wireless tag detector 32 included in the image forming apparatus 9.

The wireless tag 33 is used in, for example, an individual identification technology through wireless communication called radio frequency identification (RFID). The wireless tag detector 32 detects the wireless tag 33 using, for example, non-contact communication such as Bluetooth® or near field communication (NFC). In this case, the wireless tag 33 may be a dedicated wireless tag for identifying a visually impaired person, or a wireless tag 33 attached to an employee ID card or an entry card may include information for identifying a visually impaired person.

When a plurality of wireless tags 33 are detected, the detection unit 10 may use the wireless tag 33 having the strongest communication intensity (that is, closest to the wireless tag detector 32 or the image forming apparatus 9) as the wireless tag 33 held by the user of the image forming apparatus 9. In one example, the detection unit 10 may detect the wireless tag 33 whose detection time is the latest and whose communication time is the longest (that is, the user stops for the operation).

Then, as the processing in step S22 in FIG. 4, the determination unit 11 determines whether a visually impaired person is using the image forming apparatus 9 or is going to use the image forming apparatus 9 based on the wireless tag 33 detected by the detection unit 10. That is, the determination unit 11 determines whether the user holding the detected wireless tag 33 is a visually impaired person based on information for identifying the visually impaired person included in the detected wireless tag 33.

Finally, as the processing in step S23 in FIG. 4, the switching unit 12 enables the voice reading operation function of the image forming apparatus 9 when the determination unit 11 determines that the visually impaired person is using the image forming apparatus 9 or is going to use the image forming apparatus 9.

Third Embodiment

Figure 7:
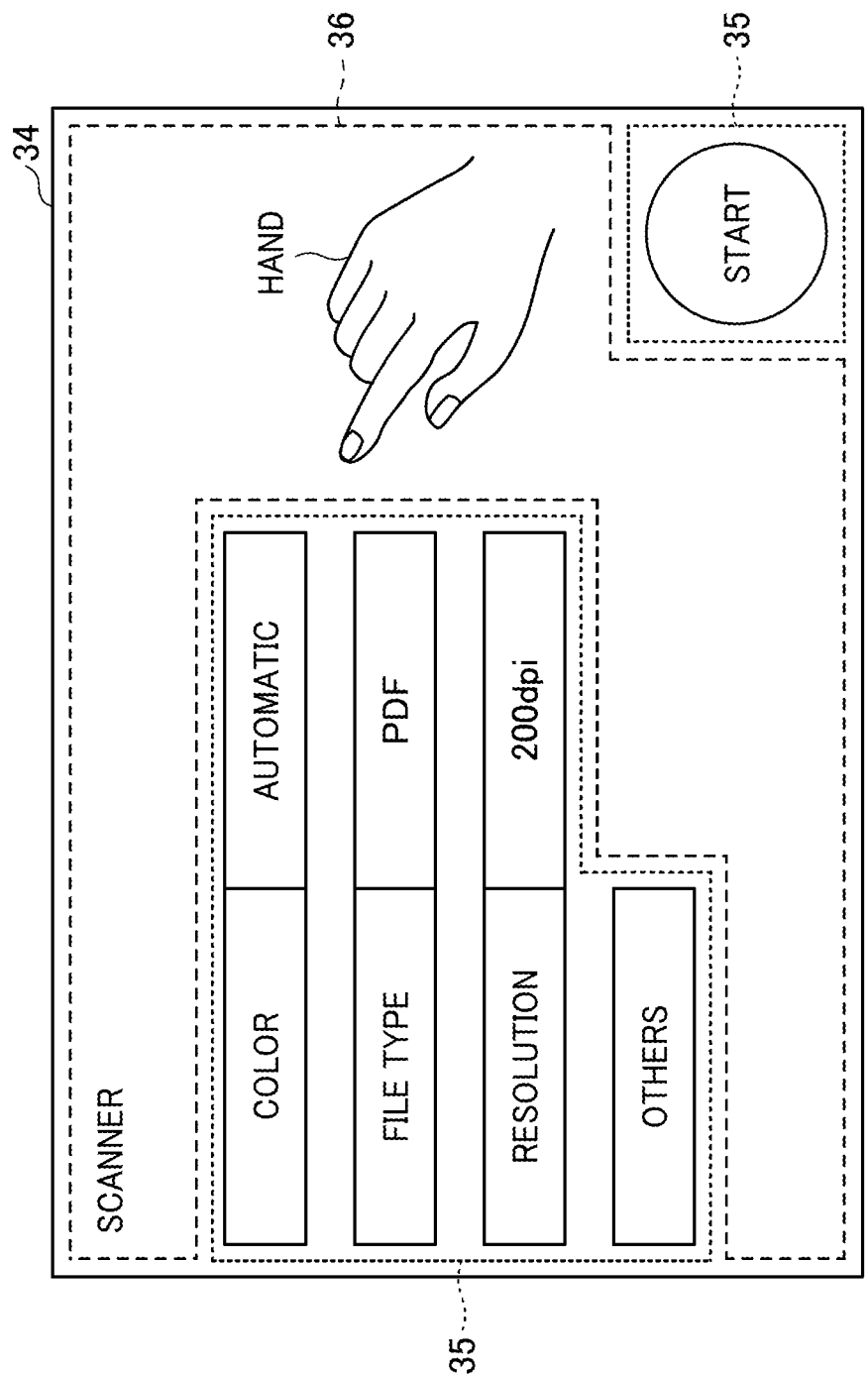
FIG. 7 is a diagram illustrating processing in an information processing apparatus according to a third embodiment of the disclosure.

FIG. 7 is a diagram illustrating processing in an information processing apparatus according to a third embodiment of the disclosure. Processing in a case where a visually impaired person operates a touch panel of the image forming apparatus 9 according to the third embodiment is described.

A display control unit 13 displays an operation screen 34 of a scanner on the touch panel of the image forming apparatus 9. As the processing in step S21 in FIG. 4, the detection unit 10 detects an operation of a user on the operation screen 34 displayed on the touch panel of the image forming apparatus 9.

Then, as the processing in step S22 in FIG. 4, the determination unit 11 determines whether a visually impaired person is using the image forming apparatus 9 or is going to use the image forming apparatus 9 based on the operation of the user detected by the detection unit 10. That is, the determination unit 11 determines whether the operation of the user is a normal operation for using the image forming apparatus 9 or an operation by a visually impaired person such as searching for an operation method by groping. For the determination, the determination unit 11 divides the operation screen 34 in FIG. 7 into an operation effective region 35 that is a region in which various buttons to be touched by the user in a normal operation are arranged, and an operation ineffective region 36 that is a region other than the operation effective region 35. Then, when the user performs an operation in the operation ineffective region 36, the determination unit 11 determines that a visually impaired person is using the image forming apparatus 9. In one example, when an operation of touching a portion indicating a button and then swiping from the portion is performed, since such an operation may be a groping motion performed by the visually impaired person, the determination unit 11 may determine the operation as not being the normal operation of pressing the button. In another example, the determination unit 11 may determine that a swiping operation that cannot be a normal operation (such as scrolling the screen) on the operation screen 34 is an operation by the visually impaired person.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The example illustrated in the configuration diagram of the functional blocks in FIG. 3 is divided into blocks in accordance with main functions for easier understanding of the processing by the information processing apparatus 1. The disclosure of the application is not limited by the method of dividing the units of processing or the name of the processing. The processing of the information processing apparatus 1 can be divided into more units of processing in accordance with the content of the processing. One unit of processing may be divided so as to include more sub-units of processing.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The group of apparatuses or devices described above is just one example of plural computing environments that implement the one or more embodiments disclosed in the specification. In some embodiments, the information processing apparatus 1 includes multiple computing devices, such as a server cluster. The plurality of computing devices are configured to communicate with each other via any type of communication link, including a network, a shared memory, or the like and perform the processing disclosed in the specification.

The invention claimed is:

1. An information processing apparatus comprising:
   circuitry configured to
      construct an operation screen, the operation screen including an operation effective region and an operation ineffective region,
      display the operation screen,
      detect information relating to a user of the information processing apparatus, the information relating to the user comprising information regarding an operation of the user on the operation screen,
      determine whether the user is a visually impaired person based on the information relating to the user, wherein the user is determined to be the visually impaired person when the information relating to the user indicates that the operation of the user occurs in the operation ineffective region, and
      based on a determination indicating that the user is the visually impaired person, enable a voice reading operation function for the visually impaired person.

2. The information processing apparatus according to claim 1,
   wherein the circuity is configured to
      analyze an image captured by a camera to detect information relating to the user and a white cane, and
      when the white cane is present near a hand of the user, determine that the user is the visually impaired person.

3. The information processing apparatus according to claim 1,
   wherein the circuity is configured to
      detect information included in a wireless tag held by the user, and
      determine whether the user is the visually impaired person based on the information included in the wireless tag.

4. The information processing apparatus according to claim 1,
   wherein the circuity is configured to
      detect information relating to a feature in an operation on the information processing apparatus by the user, and
      determine whether the user is the visually impaired person based on the information relating to the feature in the operation.

5. The information processing apparatus according to claim 1, wherein the circuitry is further configured to output a voice message to confirm whether the voice reading operation function is allowed to be enabled before the voice reading operation function is enabled.

6. The information processing apparatus according to claim 1,
   wherein the circuity is further configured to
      display at least one button on the operation screen,
      receive a user selection operation of the button, the user selection operation comprising touching a button and swiping from the button in a direction, and
      in response to the user selection operation, output a voice message that reads aloud functions of the selected button.

7. An information processing method, comprising:
   constructing an operation screen, the operation screen including an operation effective region and an operation ineffective region;
   displaying the operation screen;
   detecting information relating to a user of an information processing apparatus, the information relating to the user comprising information regarding an operation of the user on the operation screen;
   determining whether the user is a visually impaired person based on the information relating to the user, wherein the user is determined to he the visually impaired person when the information relating to the user indicates that the operation of the user occurs in the operation ineffective region; and
   based on a determination that the user is the visually impaired person, enabling a voice reading operation function for the visually impaired person.

8. A non-transitory recording medium which, when executed by one or more processors, causes the processors to perform an information processing method, the method comprising:
   constructing an operation screen, the operation screen including an operation effective region and an operation ineffective region;
   displaying the operation screen;
   detecting information relating to a user of an information processing apparatus, the information relating to the user comprising information regarding an operation of the user on the operation screen;
   determining whether the user is a visually impaired person based on the information relating to the user, wherein the user is determined to be the visually impaired person when the information relating to the user indicates that the operation of the user occurs in the operation ineffective region; and
   based on a determination that the user is the visually impaired person, enabling a voice reading operation function for the visually impaired person.

* * * * *